United States Patent
Yamamoto et al.

(10) Patent No.: US 10,081,088 B2
(45) Date of Patent: Sep. 25, 2018

(54) MAIN SPINDLE FAILURE DETECTION DEVICE FOR MACHINE TOOL AND METHOD OF DETECTING MAIN SPINDLE FAILURE

(71) Applicant: Okuma Corporation, Niwa-Gun (JP)

(72) Inventors: Seiei Yamamoto, Niwa-Gun (JP); Naoki Kawada, Niwa-Gun (JP)

(73) Assignee: Okuma Corporation, Niwa-Gun (JP)

( * ) Notice: Subject to any disclaimer, the term of this patent is extended or adjusted under 35 U.S.C. 154(b) by 10 days.

(21) Appl. No.: 15/267,475

(22) Filed: Sep. 16, 2016

(65) Prior Publication Data

US 2017/0106487 A1 Apr. 20, 2017

(30) Foreign Application Priority Data

Oct. 19, 2015 (JP) ................. 2015-205780

(51) Int. Cl.
*B23Q 17/10* (2006.01)
*G05B 19/00* (2006.01)
*B23Q 17/00* (2006.01)

(52) U.S. Cl.
CPC ........... *B23Q 17/10* (2013.01); *B23Q 17/008* (2013.01); *G05B 19/00* (2013.01)

(58) Field of Classification Search
CPC .............................. B23Q 17/10; B23Q 17/008
USPC ....................................... 73/865.9
See application file for complete search history.

(56) References Cited

U.S. PATENT DOCUMENTS 4,667,114 A * 5/1987 Rossi ................. G01P 21/02
290/40 A

FOREIGN PATENT DOCUMENTS

| JP | 06-065189 | B2 | | 8/1994 | |
|---|---|---|---|---|---|
| JP | 2009-020090 | A1 | | 1/2009 | |
| JP | 2009020090 | A | * | 1/2009 | ............ G01M 19/00 |
| JP | 2009226502 | A | * | 10/2009 | ............ B24B 19/125 |
| JP | WO 2012011534 | A1 | * | 1/2012 | .............. F16C 19/52 |
| KR | 101507929 | B1 | * | 4/2015 | .............. F16C 19/52 |

* cited by examiner

*Primary Examiner* — Lisa Caputo
*Assistant Examiner* — Jamel Williams
(74) *Attorney, Agent, or Firm* — Burr & Brown, PLLC

(57) ABSTRACT

A main spindle failure detection device for a machine tool includes a rotation speed detection unit, a reach time estimation unit, and a determining unit. The reach time estimation unit is configured to estimate a reach time in which the rotation speed of the main spindle reaches a predetermined rotation speed threshold using a non-linear model based on a rotation speed of the main spindle detected at a start of an inertia operation and a rotation speed of the main spindle detected after an elapse of preset measurement time from the start of the inertia operation. The determining unit is configured to compare the reach time estimated by the reach time estimation unit with a preset reach time in which the rotation speed reaches the rotation speed threshold, so as to determine a failure in the main spindle based on a result of the comparison.

11 Claims, 3 Drawing Sheets

MAIN SPINDLE FAILURE DETECTION DEVICE FOR MACHINE TOOL AND METHOD OF DETECTING MAIN SPINDLE FAILURE

BACKGROUND

This application claims the benefit of Japanese Patent Application Number 2015-205780 filed on Oct. 19, 2015 the entirety of which is incorporated by reference.

TECHNICAL FIELD

The disclosure relates to a device that detects a failure in a main spindle disposed in a machine tool and a method of the same.

RELATED ART

A main spindle for a machine tool is constituted of a shaft, which is a rotator, a bearing that supports the shaft, a seal that prevents contamination of an external foreign object, and a similar member. The main spindle causes a breakdown such as a seizure and a rotation failure due to excessive or insufficient frictional torque with respect to the shaft caused by a poor lubrication, contamination with foreign matter, an excessive load, and an abrasion. In case of the breakdown of the main spindle during processing with the machine tool, it has no choice but to suspend use of the machine tool until the main spindle is exchanged or repaired.

To prevent user's loss due to the suspension of use, it is required to encourage the maintenance before causing the breakdown, therefore, an advance detection of a failure in the main spindle is important.

As a device that grasps and diagnoses a state of a rotator such as a main spindle, Japanese Unexamined Patent Application Publication No. 2009-20090 (hereinafter referred to as Patent document 1), Japanese Examined Patent Application Publication No. H06-65189 (hereinafter referred to as Patent document 2), and a similar technique have been known. For example, Patent document 1 discloses a device that compares a vibration generated from a bearing with a preliminarily-measured normal vibration. Patent document 2 discloses a device that compares an amount of change in a rotation speed per unit time when a power is cut off and a shaft is rotated in an inertia state with an amount of change in a preliminary-measured normal rotation speed.

However, with the device as described in Patent document 1, which analyzes the vibration, although time required to detect a failure is short, it is necessary to have a sensor to measure the vibration, resulting in an expensive cost.

With the device as described in Patent document 2, which compares the amount of change in rotation speed in the inertia state after the power of a main spindle driving device is cut off, since rotation speed detection means is generally mounted, the cost is low. However, since the change in rotation speed with respect to elapsed time shows non-linearity as a lubrication state of a bearing changes, the amount of change in rotation speed per unit time is not constant. It takes a long time for an accurate failure diagnosis including the change in lubrication state, and therefore the diagnosis cannot be executed on a daily basis.

Therefore, an object of the disclosure is to provide a main spindle failure detection device for a machine tool that diagnoses a failure in a main spindle on a daily basis in a short time and inexpensive manner and a method of detecting the main spindle failure.

SUMMARY

In order to achieve the above-described object, there is provided a main spindle failure detection device for a machine tool according to a first aspect of the disclosure. The main spindle failure detection device includes a rotation speed detection unit, a reach time estimation unit, and a determining unit. The rotation speed detection unit is configured to detect a rotation speed of a main spindle. The reach time estimation unit is configured to estimate a reach time in which the rotation speed of the main spindle reaches a predetermined rotation speed threshold using a non-linear model. The estimation of the reach time is performed based on a rotation speed of the main spindle at a start of an inertia operation detected by the rotation speed detection unit and a rotation speed of the main spindle detected by the rotation speed detection unit after an elapse of preset measurement time from the start of the inertia operation. The determining unit is configured to compare the reach time estimated by the reach time estimation unit with a preset reach time in which the rotation speed reaches the rotation speed threshold, so as to determine a failure in the main spindle based on a result of the comparison.

The main spindle failure detection device for the machine tool according to a second aspect of the disclosure, which is in the first aspect of the disclosure, further includes a reach time measurement unit and a second determining unit. The reach time measurement unit is configured to continue the inertia operation of the main spindle when the determining unit determines the failure in the main spindle, and is configured to measure a reach time in which the rotation speed of the main spindle detected by the rotation speed detection unit reaches the rotation speed threshold. The second determining unit is configured to compare the reach time measured by the reach time measurement unit with the preset reach time, and is configured to determine the failure in the main spindle based on a result of the comparison.

With the main spindle failure detection device for the machine tool according to a third aspect of the disclosure, which is in the first or the second aspect of the disclosure, the reach time estimation unit uses an exponential function as a non-linear model.

In order to achieve the above-described object, a main spindle failure detection method for a machine tool that includes a rotation speed detection unit detecting a rotation speed of a main spindle according to a fourth aspect of the disclosure is configured as follows. The method executes a first rotation speed detection step, a second rotation speed detection step, a reach time estimation step, and a determining step. The first rotation speed detection step detects a rotation speed of the main spindle at a start of an inertia operation by the rotation speed detection unit. The second rotation speed detection step detects a rotation speed of the main spindle after an elapse of preset measurement time from the start of the inertia operation by the rotation speed detection unit. The reach time estimation step estimates a reach time in which the rotation speed of the main spindle reaches a predetermined rotation speed threshold using a non-linear model. The estimation of the reach time is performed based on the rotation speed detected at the first rotation speed detection step and the rotation speed detected at the second rotation speed detection step. The determining step compares the reach time estimated at the reach time estimation step with a preset reach time in which the rotation speed reaches the rotation speed threshold. The determining step is configured to determine the failure in the main spindle based on a result of the comparison.

The main spindle failure detection method for the machine tool according to a fifth aspect of the disclosure, which is in the fourth aspect of the disclosure, further executes a reach time measurement step and a second determining step. The reach time measurement step continues the inertia operation of the main spindle when the determining step determines the failure in the main spindle. The reach time measurement step is configured to measure a reach time in which the rotation speed of the main spindle detected by the rotation speed detection unit reaches the rotation speed threshold. The second determining step compares the reach time measured at the reach time measurement step with the preset reach time, and is configured to determine the failure in the main spindle based on a result of the comparison.

With the main spindle failure detection method for the machine tool according to a sixth aspect of the disclosure, which is in the fourth or the fifth aspect of the disclosure, the reach time estimation step uses an exponential function as a non-linear model.

With the embodiment, based on the measurement result of the change in rotation speed in a short period, the time in which the main spindle rotation speed reaches the rotation speed threshold is estimated with the non-linear model, and the estimated reach time is compared with the preset reach time. In the above manner, accurate failure determination is performed in a short period, thereby the failure in the main spindle is diagnosed on a daily basis.

Especially with the embodiments according to the second and the fifth aspects, in addition to the above-described effect, if determined as a failure first, the actual reach time until the rotation speed threshold is measured and is again compared with the preset reach time for failure determination. Thus, accuracy of failure determination is improved, thereby accidental machine stoppage is prevented even in the case where the diagnosis is not performed correctly.

DETAILED DESCRIPTION

The following describes embodiments of the present disclosure with reference to the drawings.

Figure 1:
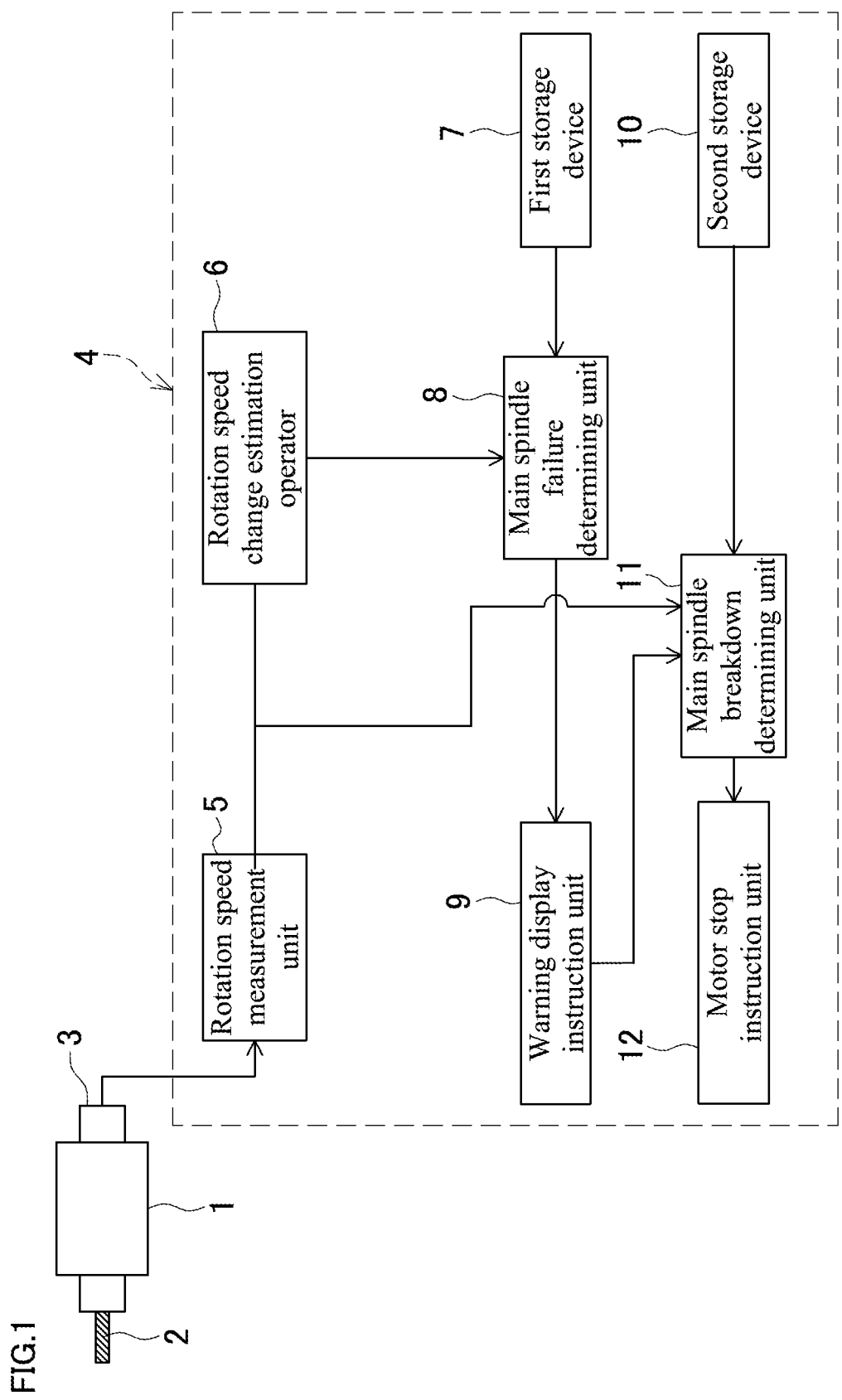
FIG. 1 is a function block diagram of a main spindle failure detection device.

FIG. 1 is a function block diagram of a main spindle failure detection device. In FIG. 1, a main spindle 1 for a machine tool and a tool 2 are illustrated. A rotation speed detector 3 is disposed at the main spindle 1. A failure detector 4 includes a rotation speed measurement unit 5 that measures a rotation speed of the main spindle 1 during an inertia operation based on a detection signal from the rotation speed detector 3. The rotation speed measurement unit 5 serves as rotation speed detection means of the disclosure together with the rotation speed detector 3.

The failure detector 4 includes a rotation speed change estimation operator 6 as reach time estimation means, a main spindle failure determining unit 8 as determining means, and a warning display instruction unit 9. The rotation speed change estimation operator 6 estimates time in which a rotation speed reaches a preset rotation speed threshold based on a measured rotation speed. The main spindle failure determining unit 8 determines a failure in the main spindle 1 through comparison of the reach time, which is operated by the rotation speed change estimation operator 6, with a preset reach time stored in a first storage device 7. The warning display instruction unit 9 instructs a warning display in the case where the main spindle failure determining unit 8 determines a failure.

Furthermore, the failure detector 4 includes a main spindle breakdown determining unit 11 as second determining means and a motor stop instruction unit 12. When the main spindle failure determining unit 8 detects a failure, the main spindle breakdown determining unit 11 obtains a rotation speed during continuous inertia operation from the rotation speed measurement unit 5 to measure time in which the obtained rotation speed reaches the rotation speed threshold. Then, the main spindle breakdown determining unit 11 compares the measured reach time with the preset reach time stored in a second storage device 10 to determine presence/absence of a failure in the main spindle 1 again. When the main spindle breakdown determining unit 11 determines the failure in the main spindle 1 again, the motor stop instruction unit 12 outputs a stop instruction to a main spindle motor. The failure detector 4 is, for example, constituted inside an NC system for a machine tool.

Figure 2:
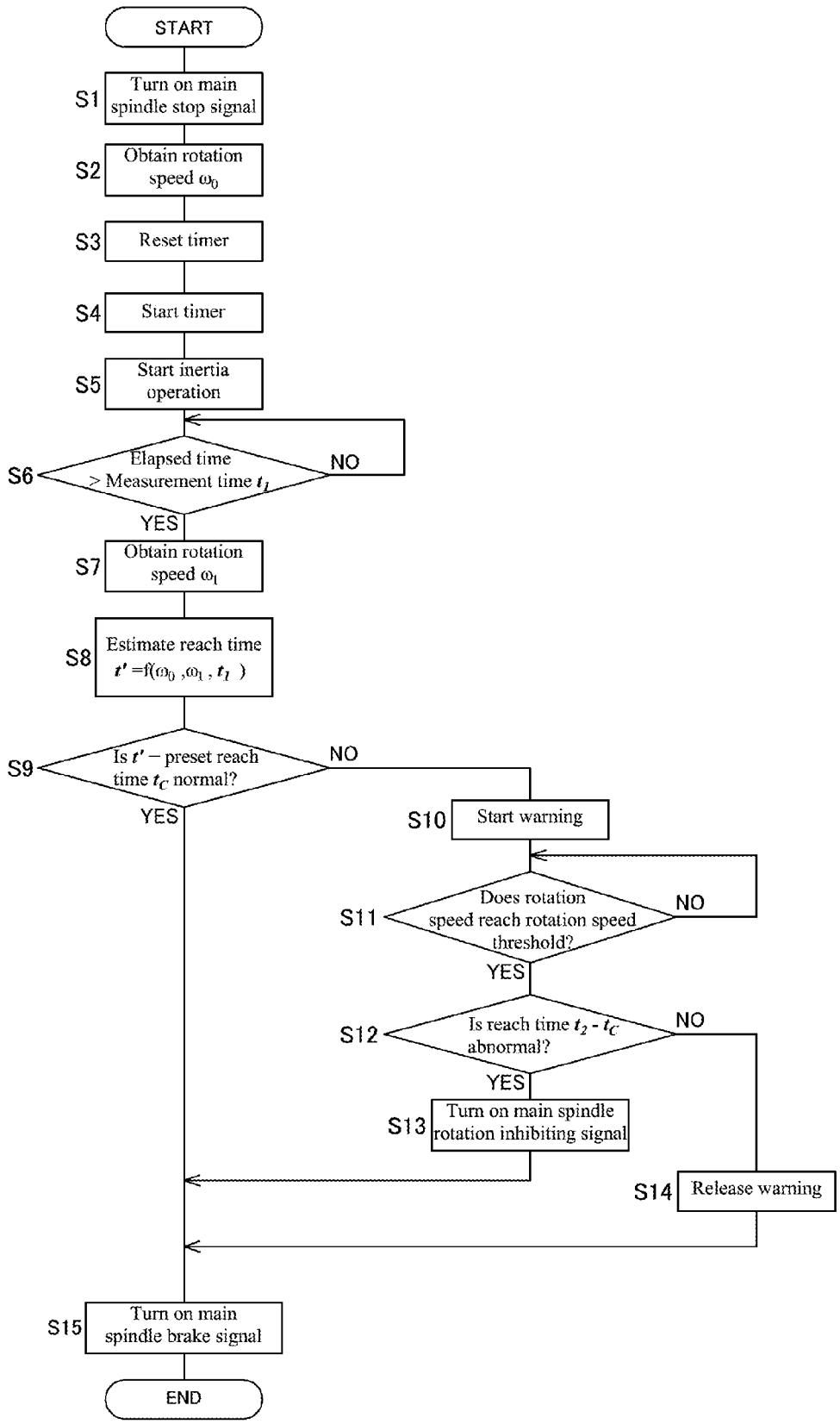
FIG. 2 is a flowchart for a method of detecting a main spindle failure.

The following describes the method of failure detection by the failure detector 4 with reference to the flowchart in FIG. 2.

First, in a machine tool with a rotating main spindle, a rotation stop signal is output at S1, and the rotation speed measurement unit 5 obtains a rotation speed $\omega_0$ immediately before a start of an inertia operation at S2 (a first rotation speed detection step).

Next, a timer to measure elapsed time of the inertia operation is reset at S3, and the timer is started for starting the measurement at S4. At S5, the power is cut off to start the inertia operation.

Next, at S6, the timer counts time until the elapsed time after starting the inertia operation reaches a measurement time $t_1$, which is used to detect a failure. When the time reaches the measurement time $t_1$, the rotation speed measurement unit 5 obtains a rotation speed $\omega_1$ at the time at S7 (a second rotation speed detection step).

Next, at S8, the rotation speed change estimation operator 6 estimates a reach time t' in which the rotation speed reaches the preset rotation speed threshold based on the rotation speeds $\omega_0$ and $\omega_1$, which are obtained at S2 and S7, and the measurement time $t_1$ using a non-linear model (a reach time estimation step).

Figure 3:
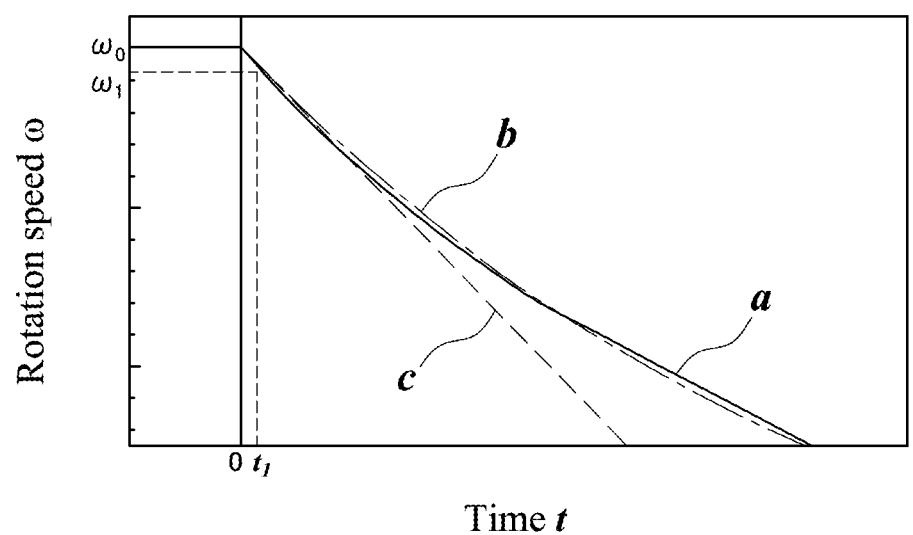
FIG. 3 is a graph showing a rotation speed during an inertia operation and an estimation example of the rotation speed.

The following describes the rotation speed during the inertia operation and an example of estimation of the rotation speed with reference to FIG. 3. FIG. 3 shows the time in the horizontal axis and the rotation speed in the vertical axis. The solid line indicated by a shows the rotation speed during the inertia operation, the one dot chain line indicated by b shows an estimation result of the rotation speed used in this disclosure, and the dashed line indicated by c shows a result estimated using a linear model based on the rotation speeds $\omega_0$ and $\omega_1$, which are obtained through the measurement, and the measurement time $t_1$.

In FIG. 3, the one dot chain line b represents the non-linear model shown by the following expression (A), and the dashed line c represents the linear model shown by the following expression (B). Here, t indicates any given elapsed time after starting the inertia operation, $\omega$ indicates the rotation speed, and C indicates a constant.

[Expression 1]

$$\omega = \omega_0 + \left\{\left(\frac{\omega_1 - \omega_0}{t_1}\right)\exp\left(\frac{-t}{C}\right)\right\}t \quad \text{(A)}$$

$$\omega = \omega_0 + \frac{\omega_1 - \omega_0}{t_1}t \quad \text{(B)}$$

As apparent from FIG. 3, since the change in rotation speed per unit time is not constant, an error increases as the elapsed time t increases, resulting in inaccurate diagnosis in the estimation using the linear model represented by the dashed line c. However, in the estimation using the non-linear model represented by the one dot chain line b, an estimation error becomes small.

While the exponential function is used as the non-linear model, another non-linear model, such as a polynomial and a logarithmic function, and another model that switches a plurality of equations in the middle may be used. Except for the rotation speeds $\omega_0$ and $\omega_1$ and the measurement time $t_1$, the equation may be changed with another information such as an operation condition of the main spindle and a body temperature.

Next, at S9 the main spindle failure determining unit 8 compares a difference between the reach time t', which is obtained at S8, and a preset reach time $t_C$ that reaches the rotation speed threshold, which is preliminary measured or preset and stored in the first storage device 7, with a threshold for determination to determine whether a failure occurs or not (a determining step). Since it is assumed that there are cases of $t_C=t_1$ where a friction resistance reduces due to an abrasion or a similar factor and $t_1>t_C$ where the friction resistance increases due to a poor lubrication or a similar factor, a plurality of the thresholds for determination are provided. When this time difference is between a plurality of the thresholds, it is determined as normal. Meanwhile, if this time difference is larger than the maximum threshold or is smaller than the minimum threshold, it is determined as a failure.

At S9, when the main spindle failure determining unit 8 determines that the main spindle 1 is normal, a main spindle brake signal is turned ON at S15 to terminate the inertia rotation of the main spindle 1, thus terminating the failure detection process.

Meanwhile, at S9, when the main spindle failure determining unit 8 determines that the main spindle 1 has a failure, the warning display instruction unit 9 starts warning at S10. To determine whether the factor determined as failure is the estimation accuracy performed at S8 or the failure in the main spindle 1, at S11, the inertia operation is continued until the main spindle rotation speed reaches the rotation speed threshold and a reach time $t_2$ at the time is measured (a reach time measurement step).

At S12, the main spindle breakdown determining unit 11 compares a difference between the reach time $t_2$ and the preset reach time $t_C$ in which the rotation speed reaches the rotation speed threshold with the threshold for determination to determine whether the factor is the estimation accuracy or the failure in the main spindle (a second determining step).

Since it is assumed that there are cases of $t_C>t_2$ where a friction resistance reduces due to an abrasion or a similar factor and $t_2>t_C$ where the friction resistance increases due to a poor lubrication or a similar factor, a plurality of the thresholds for determination are used at S12 similar to S9. When this time difference is between a plurality of the thresholds, it is determined that the estimation accuracy is the factor. Meanwhile, if this time difference is larger than the maximum threshold or is smaller than the minimum threshold, it is determined that the main spindle failure is the factor. The thresholds may be identical to the thresholds used at S9.

At S12, if determined that the warning is caused by the estimation accuracy, the warning is released at S14 to allow the main spindle 1 to rotate continuously. The main spindle brake signal is turned ON at S15 to terminate the inertia operation of the main spindle 1, thus terminating the failure detection process.

Meanwhile, if determined that the main spindle 1 has a failure again at S12, the main spindle breakdown determining unit 11 determines that a breakdown occurs and inhibits the main spindle rotation via the motor stop instruction unit 12 at S13. The main spindle brake signal is turned ON at S15, thus terminating the failure detection process.

With the main spindle failure detection device and the method with the configuration, based on the measurement result of the change in rotation speed in a short period, the time in which the main spindle rotation speed reaches the rotation speed threshold is estimated with the non-linear model using the exponential function, and the estimated reach time is compared with the preset reach time. In the above manner, failure determination is accurately in a short period, thereby the failure in the main spindle 1 is diagnosed on a daily basis.

Especially here, if determined as failure, the actual reach time until the rotation speed threshold is measured and is again compared with the preset reach time for failure determination. Therefore, the accuracy of failure determination is improved, thereby ensuring preventing accidental machine stoppage even in the case where the diagnosis is not performed correctly.

The configuration includes the two storage devices in the failure detector, but the storage devices may be consolidated into one storage device.

Here, after the first failure determination, the inertia operation is continued and the reach time until the rotation speed lowers up to the rotation speed threshold is measured. Then, this reach time is compared with the preset reach time for failure determination again. However, the second failure determination (the reach time measurement step, the second determining step) can be omitted.

Furthermore, it is not limited to the case that the NC system also serves as the failure detector, but the failure detector can also be formed by a computer outside the machine tool. This allows simultaneous monitoring of a main spindle failure in a plurality of machine tools.

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention, in particular as limits of value ranges.

What is claimed is:

1. A main spindle failure detection device for a machine tool, comprising:
   a spindle rotation speed detector;
   a first computer-readable medium having computer-executable components that estimate a reach time in which the rotation speed of the main spindle reaches a predetermined rotation speed threshold using a non-linear model, the estimation being performed based on a rotation speed of the main spindle at a start of an inertia operation detected by the rotation speed detection unit and a rotation speed of the main spindle detected by the rotation speed detection unit after an elapse of preset measurement time from the start of the inertia operation; and computer-executable components, on said first computer-readable medium or on a second computer-readable medium, that compare the reach time estimated by the reach time estimation unit with a preset reach time in which the rotation speed reaches the rotation speed threshold, so as to determine a failure in the main spindle based on a result of the comparison.

2. The main spindle failure detection device for the machine tool according to claim 1, further comprising:
a reach time measurement unit configured to continue the inertia operation of the main spindle when the determining unit determines the failure in the main spindle, the reach time measurement unit being configured to measure a reach time in which the rotation speed of the main spindle detected by the rotation speed detection unit reaches the rotation speed threshold; and
a second determining unit configured to compare the reach time measured by the reach time measurement unit with the preset reach time, the second determining unit being configured to determine the failure in the main spindle based on a result of the comparison.

3. The main spindle failure detection device for the machine tool according to claim 2, wherein
the reach time estimation unit uses an exponential function as a non-linear model.

4. The main spindle failure detection device for the machine tool according to claim 1, wherein
the reach time estimation unit uses an exponential function as a non-linear model.

5. The main spindle failure detection device for the machine tool according to claim 1, wherein the first computer-readable medium is non-transitory.

6. A main spindle failure detection method, comprising:
detecting a first rotation speed of a rotatable shaft of a main spindle;
applying force to the shaft to increase the rotation speed of the shaft;
detecting a second rotation speed of the rotatable shaft after an elapse of a preset measurement time from the start of said applying force to the shaft;
calculating an estimated reach time for the rotation speed of the shaft to reach a predetermined rotation speed threshold using a non-linear model, said calculating an estimated reach time comprising inserting into said non-linear model a value of said first rotation speed and a value of said second rotation speed; and
comparing said estimated reach time with a preset reach time.

7. A main spindle failure detection method as recited in claim 6, wherein the method further comprises:
continuing said applying force to the shaft after said comparing said estimated reach time with said preset reach time,
determining an actual reach time for the rotation speed of the shaft to reach said predetermined rotation speed threshold, and
comparing said actual reach time with said preset reach time.

8. A main spindle failure detection method as recited in claim 6, wherein the method further comprises determining whether there is a calculated failure in the main spindle based on said comparing said estimated reach time with said preset reach time.

9. A main spindle failure detection method as recited in claim 8, wherein the method further comprises activating a warning display unit after a calculated failure in the main spindle.

10. A main spindle failure detection method as recited in claim 8, wherein the method further comprises:
continuing said applying force to the shaft after said comparing said estimated reach time with said preset reach time,
determining an actual reach time for the rotation speed of the shaft to reach said predetermined rotation speed threshold, and
comparing said actual reach time with said preset reach time.

11. A main spindle failure detection method as recited in claim 10, wherein the method further comprises determining whether there was an inaccurate calculated failure in the main spindle based on said comparing said actual reach time with said preset reach time.

* * * * *